(12) United States Patent
Schwetman, Jr. et al.

(10) Patent No.: US 9,948,587 B2
(45) Date of Patent: Apr. 17, 2018

(54) DATA DEDUPLICATION AT THE NETWORK INTERFACES

(71) Applicant: Oracle International Corporation, Redwood Shores, CA (US)

(72) Inventors: Herbert Dewitt Schwetman, Jr., Austin, TX (US); Pranay Koka, Austin, TX (US); Arslan Zulfiqar, Madison, WI (US)

(73) Assignee: Oracle International Corporation, Redwood Shores, CA (US)

(*) Notice: Subject to any disclaimer, the term of this patent is extended or adjusted under 35 U.S.C. 154(b) by 42 days.

(21) Appl. No.: 14/455,782

(22) Filed: Aug. 8, 2014

(65) Prior Publication Data
US 2016/0043977 A1 Feb. 11, 2016

(51) Int. Cl.
| | |
|---|---|
| *H04L 12/58* | (2006.01) |
| *G06F 12/12* | (2016.01) |
| *G06F 3/06* | (2006.01) |
| *H04L 29/08* | (2006.01) |
| *G06F 12/121* | (2016.01) |

(52) U.S. Cl.
CPC ........... *H04L 51/12* (2013.01); *G06F 3/067* (2013.01); *G06F 3/0608* (2013.01); *G06F 3/0641* (2013.01); *G06F 12/121* (2013.01); *H04L 67/2842* (2013.01); *H04L 67/2852* (2013.01)

(58) Field of Classification Search
CPC ....... G06F 3/0641; G06F 3/0608; H04L 12/58
See application file for complete search history.

(56) References Cited

U.S. PATENT DOCUMENTS

| | | | | |
|---|---|---|---|---|
| 5,390,316 A | * | 2/1995 | Cramer | G06F 3/14 709/201 |
| 5,794,239 A | * | 8/1998 | Walster | G06F 17/30985 |
| 2002/0166018 A1 | * | 11/2002 | Kim | G06F 13/26 710/260 |
| 2004/0111600 A1 | * | 6/2004 | Kaler | H04L 9/0838 713/150 |

(Continued)

OTHER PUBLICATIONS

Yoo, A., Chow, E., Henderson, K., McLendon, W., Hendrickson, B., and Catalyurek, U., "A Scalable Distributed Parallel Breadth-First Search Algorithm on BlueGene/L;" in Proceedings of the 2005 ACM/IEEE Conference on Supercomputing, Washington, DC, USA, Nov. 12, 2005 (19 pages).

Satish, N., Kim, C., Chhugani, J., and Dubey, P; "Large-scale energy-efficient graph traversal: a path to efficient data-intensive supercomputing,": in Proceedings of the International Conference on High Performance Computing, Networking, Storage and Analysis; Los Alamitos, California, Nov. 10, 2012 (11 pages).

(Continued)

*Primary Examiner* — Charles Rones
*Assistant Examiner* — Tian-Pong Chang
(74) *Attorney, Agent, or Firm* — FBFK PC

(57) ABSTRACT

A method for data deduplication during execution of an application on a plurality of computing nodes, including: generating, by a first processor in a first computing node executing the application, a first message to process application data owned by a second computing node executing the application; receiving, by a first network interface (NI) of the first computing node, the first message; extracting, by the first NI, a first key from the first message; determining, by the first NI, the first key is not a duplicate; and placing, by the first NI and in response to the first key not being a duplicate, the first message on a network connecting the first computing node to the second computing node.

18 Claims, 9 Drawing Sheets

(56) References Cited

U.S. PATENT DOCUMENTS

| | | | | |
|---|---|---|---|---|
| 2005/0021622 A1* | 1/2005 | Cullen | ............... | G06Q 30/02 |
| | | | | 709/204 |
| 2006/0288085 A1* | 12/2006 | Alam | ............. | G06F 9/44521 |
| | | | | 709/218 |
| 2009/0276483 A1* | 11/2009 | Lind | ............... | G06F 9/466 |
| | | | | 709/201 |
| 2010/0142382 A1* | 6/2010 | Jungck | ............. | H04L 63/0245 |
| | | | | 370/242 |
| 2014/0126711 A1* | 5/2014 | Barinov | ............ | H04M 3/5175 |
| | | | | 379/265.02 |
| 2014/0280433 A1* | 9/2014 | Messerli | ........... | H04L 67/06 |
| | | | | 709/201 |
| 2015/0006735 A1* | 1/2015 | Chai | ............... | G06F 15/00 |
| | | | | 709/226 |

OTHER PUBLICATIONS

Suh, Y-J., and Shin, K., "All-to-All Personalized Communication in Multidimensional Torus and Mesh Networks," IEEE Transactions on Parallel and Distributed Systems, vol. 12, No. 1; Jan. 1, 2001 (22 pages).

Leiserson, C., Abuhamdeh, Z., Douglas, D., Feynman, C., Ganmukhi, M., Hill, J., Hillis, W., Kuszmaul, B., St. Pierre, M., Wells, D., Wong-Chan, M., Yang, S-W., and Zak, R; The Network Architecture of the Connection Machine CM-5; Journal of Parallel and Distributed Computing, vol. 33, No. 2, Mar. 15, 1996 (14 pages).

\* cited by examiner

DATA DEDUPLICATION AT THE NETWORK INTERFACES

BACKGROUND

Due to the rapid growth of data, "big data" problems such as graph traversal are becoming increasingly important. The scale of these problems makes it infeasible to fit the complete application data into a single computing node. Instead, the massive application data is partitioned over many computing nodes, such that each computing node owns a portion of the total application data and is responsible for processing it.

In order to successfully execute the application, it is necessary for messages to be exchanged between the multiple computing nodes; however, many of these messages are duplicates. These duplicate messages consume computing resources including bandwidth on the network connecting the multiple computing nodes. Regardless, the use of multiple computing nodes to execute a single application with massive application data remains popular.

SUMMARY

In general, in one aspect, the invention relates to a method for data deduplication during execution of an application on a plurality of computing nodes. The method comprises: generating, by a first processor in a first computing node executing the application, a first message to process application data owned by a second computing node executing the application; receiving, by a first network interface (NI) of the first computing node, the first message; extracting, by the first NI, a first key from the first message; determining, by the first NI, the first key is not a duplicate; and placing, by the first NI and in response to the first key not being a duplicate, the first message on a network connecting the first computing node to the second computing node.

In general, in one aspect, the invention relates to a system for data deduplication during execution of an application. The system comprises: a first processor executing the application; a second processor executing the application; and a network interface (NI) connected to a network and comprising: a first data structure accessible to the first processor; a second data structure accessible to the second processor; a key position register storing a location of a first key in a first message, wherein the first message comprises a request to process application data; a key width register storing a width of the first key in the first message; and a filter engine configured to extract the first key and discard the first message in response to the first key being a duplicate.

In general, in one aspect, the invention relates to a system for data deduplication during execution of an application. The system comprises: a network; a first node connected to the network and comprising: a first processor executing the application and configured to generate a first message to process application data owned by a second processor; and a first network interface (NI) configured to: determine the first message is not a duplicate; and place the first message on the network in response to the first message not being a duplicate; and a second node connected to the network and comprising: the second processor executing the application; and a second NI configured to: receive the first message from the network; and store the first message in a data structure accessible to the second processor.

Other aspects of the invention will be apparent from the following description and the appended claims.

DETAILED DESCRIPTION

Figure 1:
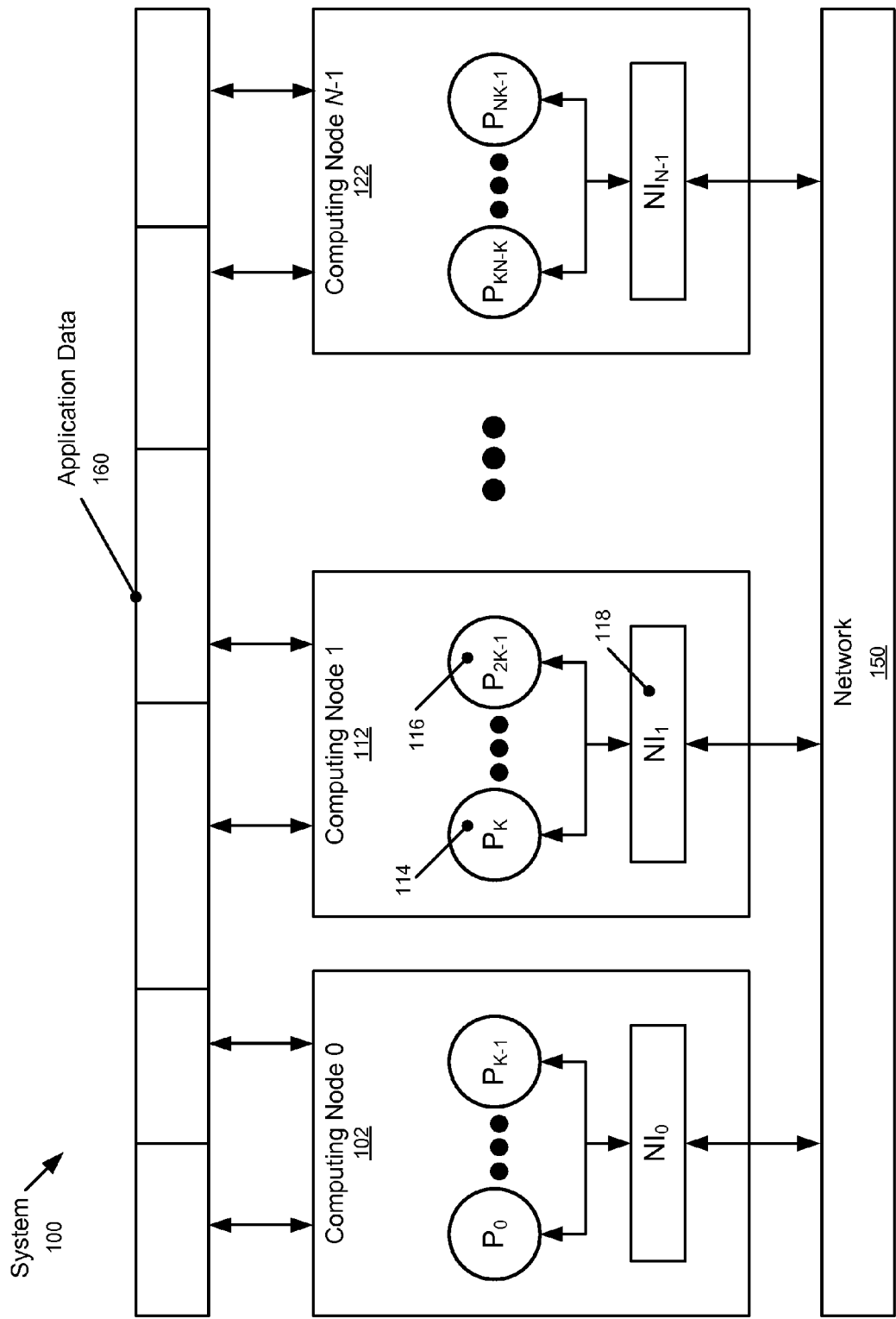
FIG. 1 shows a system for data deduplication in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for data deduplication during the execution of an application. Specifically, there exist multiple computing nodes exchanging (sending/receiving) messages using a network. Data deduplication may be performed only by the sending computing node, only by the receiving computing node, or by both the sending and receiving computing nodes. Once a message is generated by a processor on a local computing node to process application data owned by a processor on a remote computing node, the network interface on the local node determines whether a duplicate message has already been sent (e.g., by another processor on the local computing node). If the message is a duplicate it is discarded; otherwise, the message is sent. The network interface on the remote computing node determines whether a duplicate message has already been received (e.g., from another computing node). If the message is a duplicate it is discarded; otherwise, the message is forwarded by the network interface on the remote node to the processor owning the application data.

FIG. 1 shows a system (100) in accordance with one or more embodiments of the invention. As shown in FIG. 1, the system (100) has many components including N computing nodes (i.e., Computing Node 0 (102), Computing Node 1 (112), Computing Node N−1 (122)) and a network (150) connecting the computing nodes (102, 112, 122). Each computing node includes K processors and a network interface that operatively connects the processors in the computing node to the network (150). For example, computing node 1 (112) includes processor K (114) to processor 2K−1 (116). The processors (114, 116) in computing node 1 (112) are connected to the network (150) by network interface 1 (118). The network (150) and the computing nodes (102, 112, 122) may be located on a single device (e.g., personal computer (PC), tablet PC, server, mainframe, laptop, smart phone, etc.) or may be spread across multiple devices. The network (150) may have wired and/or wireless segments.

Although each computing node in FIG. 1 is shown as having the same number of processors, those skilled in the art, having the benefit of this detailed description, will appreciate that two computing nodes may have different numbers of processors.

In one or more embodiments of the invention, the system (100) is used to execute an application (e.g., graph analysis/traversal) having a large amount of application data (160). Specifically, the application is implemented as multiple processes/threads and each process/thread is executed in parallel by one or more processors in a computing node. Further, each processor owns a non-overlapping portion of the application data (160). For example, a graph has multiple graph nodes connected by edges. Each processor may own one or more graph nodes. During execution of the application, messages may be exchanged between processors of different computing nodes. The application uses a function-shipping model of communication. In other words, a message includes a request to process a portion of application data (160) (e.g., a graph node), and the message is sent to the processor owning the portion to perform the requested processing. Those skilled in the art, having the benefit of this detailed description, will appreciate that it is possible for a computing node to receive multiple duplicate requests to process the same portion of data. These requests are redundant and unnecessarily consume computing resources in the system (100), including bandwidth on the network (150).

Figure 2:
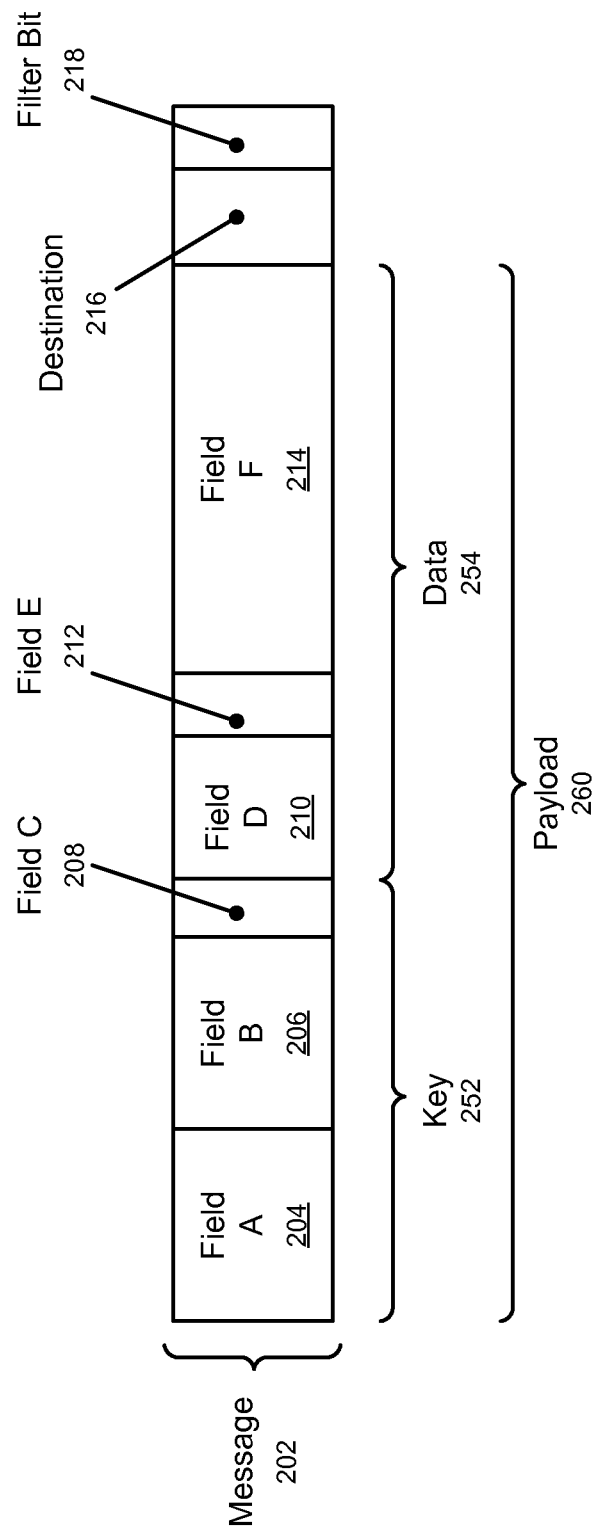
FIG. 2 shows a message in accordance with one or more embodiments of the invention.

FIG. 2 shows a message (202) in accordance with one or more embodiments of the invention. The message (202) may be generated by a processor on a computing node (e.g., Processor K (114) on Computing Node 1 (112)). The message (202) may be exchanged between processors on different computing nodes (102, 112, 122) connected by the network (150). As shown in FIG. 2, the message (202) may have a payload (260), a destination field (216), and a filter bit (218).

In one or more embodiments of the invention, the message (202) includes the destination field (216). The destination field (216) is a set of bits specifying the target processor on the remote computing node. The remote computing node itself may be identifiable from the destination field (216). The fixed size of the destination field (216) is a design/implementation choice. For example, the destination field (216) may be 10 bits in size.

In one or more embodiments of the invention, the message (202) includes the filter bit (218). If the filter bit (218) is set, the message (202) will be subjected to one or more filtering/deduplication processes (discussed below). If the filter bit (218) is not set, the message (202) will be exempted from one or more filtering/deduplication processes (discussed below). In one or more embodiments of the invention, the filter bit (218) is set (or not set) by the processor that creates the message (202). Although in FIG. 2 the filter bit (218) is a single bit, in other embodiments multiple bits may be used to subject the message (202) or exempt the message (202) from one or more filtering/deduplication processes.

In one or more embodiments of the invention, the message (202) includes the payload (260). The payload may be of any size (e.g., 128 bits). The payload (260) may identify a portion of the application data (160) and include a request to process the portion of application data (160). The payload (260) may include a key (252) and data (254). In one or more embodiments, the key (252) corresponds to a portion of a field, one field, and/or a concatenation of multiple fields in the message (202). As shown in FIG. 2, the key (252) is a concatenation of field A (204), field B (206), and field C (208). In one or more embodiments of the invention, the data (254) includes all portions of the payload (260) that are not part of the key (252). Accordingly, the data (254) may correspond to a portion of a field, a single field, and/or a concatenation of multiple fields in the message (202). As shown in FIG. 2, the data (254) includes field D (210), field E (212), and field F (214). Both the fixed size of the key (252) and the fixed size of the data (254) are design/implementation choices.

In one or more embodiments of the invention, the key (252) is used to identify duplicate messages. In other words, two messages having identical keys are designated as duplicates, regardless of whether the data (254) segments of the messages are identical. For example, assume there exists two messages: message A and message B. Message A has a key of "123456" and data of "9998998746". Message B has a key of "123456" and data of "4448448746". Message B is a duplicate of message A because of the matching keys. Message A is a duplicate of message B because of the matching keys.

Figure 3:
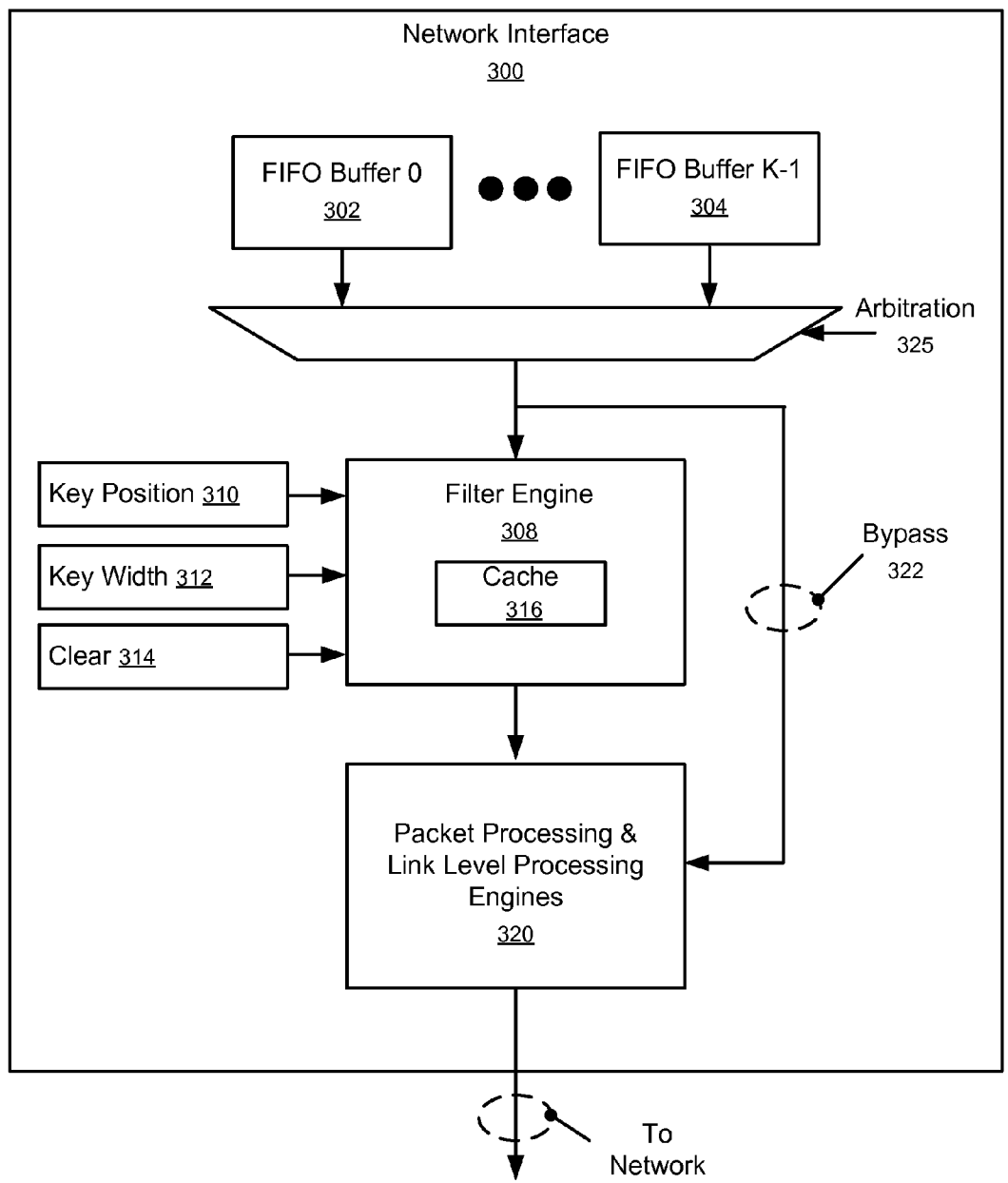
FIG. 3 and FIG. 4 show network interfaces in accordance with one or more embodiments of the invention.

FIG. 3 shows a network interface (300) in accordance with one or more embodiments of the invention. The network interface (300) may correspond to any network interface shown in FIG. 1 (e.g., NI 1 (118)). Moreover, the network interface (300) may correspond to any combination of hardware and software to connect multiple processors in a computing node to a network (e.g., network (150)). As shown in FIG. 3, the network interface (300) has multiple components including: one or more First-In First-Out (FIFO) buffers (i.e., FIFO Buffer 0 (302), FIFO Buffer K−1 (304)), a filter engine (308), and packet processing and link level processing engines (320). Each of these components is discussed below.

In one or more embodiments of the invention, the network interface (300) includes multiple FIFO buffers (302, 304). There may be one FIFO buffer per processor connected to the network interface (300). A processor may generate a message (e.g., message (202)) and then store the message in the processor's corresponding FIFO buffer (302, 304). In other words, the FIFO buffers (302, 304) are accessible to the processors. Although FIG. 3 specifically shows FIFO buffers, those skilled in the art, having the benefit of this detailed description, will appreciate that other types of data structures may also be used. Messages may be selected from the FIFO buffers (302, 304) using any type of arbitration (325).

In one or more embodiments of the invention, the network interface (300) includes the filter engine (308). As shown in FIG. 3, the filter engine (308) may include a cache (316). The cache (316) identifies/specifies the keys of messages that have already been sent by the network interface (300) (i.e., the keys of messages that have already been placed on the network by the network interface (300)). For example, the cache (316) may be indexed according to keys.

In one or more embodiments of the invention, there exist three registers: a key position (310), a key width (312), and a clear register (314). The filter engine (308) has at least read access to these registers (310, 312, 314). The value in the key position register (310) identifies/specifies the starting position of the key in the message. The value in the key width register (312) identifies/specifies the size of the key in the message. Populating the clear register (314) may erase the cache (316) or other storage in the filter engine (308). Although the registers (310, 312, 314) are shown as being external to the filter engine (308), in other embodiments of the invention some or all of the registers (310, 312, 314) are internal to the filter engine (308).

In one or more embodiments of the invention, the filter engine (308) is configured to determine whether a message is a duplicate message. In order to determine whether the message is a duplicate message, the filter engine (308) may first extract the key from the message according to the values set in the key position register (310) and the key width register (312), and then attempt to match the extracted key against the keys identified/specified in the cache (316). If a matching key exists, the extracted key is deemed to be a duplicate key, and thus the message from which the key was extracted is deemed to be a duplicate message. However, if the matching attempt is unsuccessful, then the extracted key is deemed not to be a duplicate, and thus the message from which the key was extracted is deemed not to be a duplicate message.

In one or more embodiments of the invention, the filter engine (308) is configured to discard duplicate messages. The filter engine (308) may also be configured to update (i.e., populate) the cache (316) with the non-duplicate keys, and forward the non-duplicate messages to the packet processing and link level processing engine (320).

Although FIG. 3 shows a cache (316) for identifying/specifying keys of messages that have already been sent by the network interface (300), those skilled in art, having the benefit of this detailed description, will appreciate that any data structure or storage may be used to identify/specify keys of sent messages. Moreover, those skilled in the art, having the benefit of this detailed description, will appreciate that the clear register (314) may be set at any time to clear the cache (316) and thus erase the record of sent messages. In one or more embodiments of the invention, the filer engine (308) may be disabled by writing a "0" to the key width register (312). In such embodiments, all messages, even potentially duplicate messages, are sent to the packet processing and link level engines (320).

As shown in FIG. 3, the network interface (300) includes a bypass (322). If a selected message has an asserted/set filter bit (i.e., filter bit (218) in message (202)), the message will be forwarded to the filter engine (308). However, if the filter bit of the selected message is not asserted/set, the selected message takes the bypass (322) and is forwarded to the packet processing and link level engines (320), effectively avoiding the filter engine (308). In one or more embodiments, the filter bit is removed from the message, regardless of whether it is asserted, before the message is forwarded to the packet processing and link level engines (320).

In one or more embodiments of the invention, the network interface (300) includes the packet processing and link level processing engines (320). These engines are configured to prepare the message for transit and place the message on the network. For example, these engines may add the necessary headers to the message to reach the intended destination computing node. As another example, these engines (320) may add Cyclical Redundancy Check (CRC) codes or other features to the message.

Figure 4:
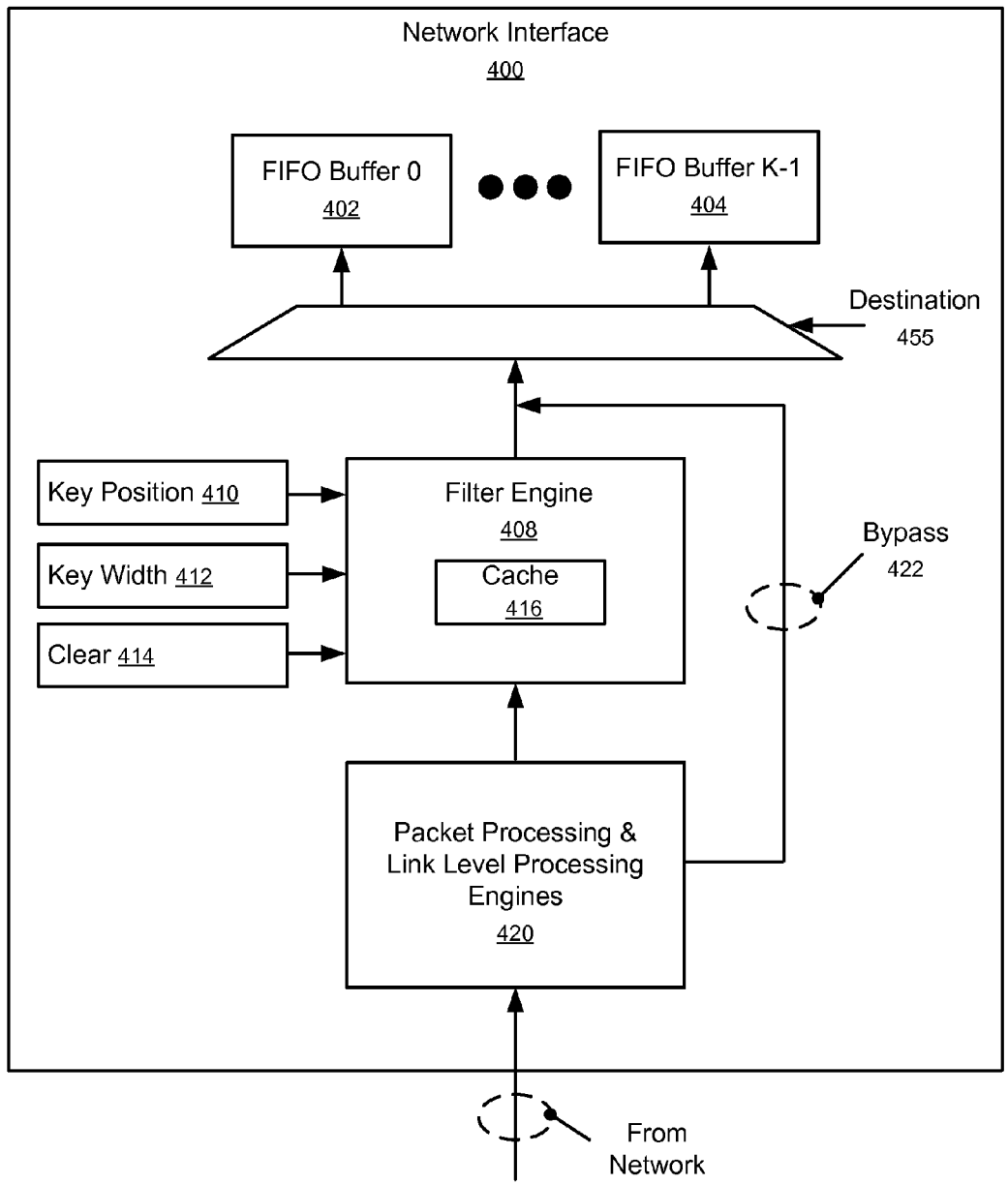

FIG. 4 shows a network interface (400) in accordance with one or more embodiments of the invention. The network interface (400) may correspond to any network interface shown in FIG. 1 (e.g., NI 1 (118)). Further, the network interface (400) may correspond to any combination of hardware and software to connect multiple processors in a computing node to a network (e.g., network (150)). Further still, any network interface in FIG. 1 may have both the components shown in FIG. 3 and the components shown in FIG. 4. As shown in FIG. 4, the network interface (400) has multiple components including: one or more FIFO buffers (i.e., FIFO Buffer 0 (402), FIFO Buffer K−1 (404)), a filter engine (408), and packet processing and link level processing engines (420). Each of these components is discussed below.

In one or more embodiments of the invention, the network interface (400) includes the packet processing and link level processing engines (420). These engines are configured to receive a message from the network. These engines (420) may also evaluate any CRC codes in the received message and strip the received message of information that was only needed for transit on the network (e.g., packet headers).

In one or more embodiments of the invention, the network interface (400) includes the filter engine (408). As shown in FIG. 4, the filter engine (408) may include a cache (416). The cache (416) identifies/specifies the keys of messages that have already been received by the network interface (400) (i.e., the keys of messages that have already been received on the network by the network interface (400)). For example, the cache (416) may be indexed according to keys.

In one or more embodiments of the invention, there exist three registers: a key position (410), a key width (412), and a clear register (414). The filter engine (408) has at least read access to these registers (410, 412, 414). The value in the key position register (410) identifies/specifies the starting position of the key in the received message. The value in the key width register (412) identifies/specifies the size of the key in the received message. Populating the clear register (414) may erase the cache (416) or other storage in the filter engine (408). Although the registers (410, 412, 414) are shown as being external to the filter engine (408), in other embodiments of the invention some or all of the registers (410, 412, 414) are internal to the filter engine (408).

In one or more embodiments of the invention, the filter engine (408) is configured to determine whether a received message is a duplicate message. In order to determine whether the received message is a duplicate message, the filter engine (408) may first extract the key from the message according to the values set in the key position register (410) and the key width register (412), and then attempt to match the extracted key against the keys identified/specified in the cache (416). If a matching key exists, the extracted key is deemed to be a duplicate key, and thus the message from which the key was extracted is deemed to be a duplicate message. However, if the matching attempt is unsuccessful, then the extracted key is deemed not to be a duplicate, and thus the message from which the key was extracted is deemed not to be a duplicate message.

In one or more embodiments of the invention, the filter engine (408) is configured to discard duplicate messages. The filter engine (408) may also be configured to update (i.e., populate) the cache (316) with the non-duplicate keys, and forward the non-duplicate messages, or at least the payloads of the non-duplicate messages, to one of the FIFO buffers (402, 404).

Although FIG. 4 shows a cache (416) for identifying/specifying keys of messages that have already been received by the network interface (400), those skilled in art, having the benefit of this detailed description, will appreciate that any data structure or storage may be used to identify/specify keys of received messages. Moreover, those skilled in the art, having the benefit of this detailed description, will appreciate that the clear register (414) may be set at any time to clear the cache (316) and thus erase the record of received messages. In one or more embodiments of the invention, the filter engine (408) may be disabled by writing a "0" to the key width register (412).

In one or more embodiments of the invention, the network interface (400) includes multiple FIFO buffers (402, 404). There may be one FIFO buffer per processor connected to the network interface (400). A received message, or at least the payload of a received message, may be stored in the FIFO buffer corresponding to the destination processor (455) specified in the received message (e.g., destination (216) in message (202)). Although FIG. 4 specifically shows FIFO buffers, those skilled in the art, having the benefit of this detailed description, will appreciate that other types of data structures may also be used.

As shown in FIG. 4, the network interface (400) includes a bypass (422). If a received message has an asserted/set filter bit (i.e., filter bit (218) in message (202)), the message will be forwarded to the filter engine (408). However, if filter bit of the received message is not asserted/set, the received message takes the bypass (422) and is stored in the appropriate FIFO buffer (402, 404), effectively avoiding the filter engine (408). In one or more embodiments, the filter bit is removed from the received message, regardless of whether it is asserted, before the message is forwarded for storage.

Figure 5:
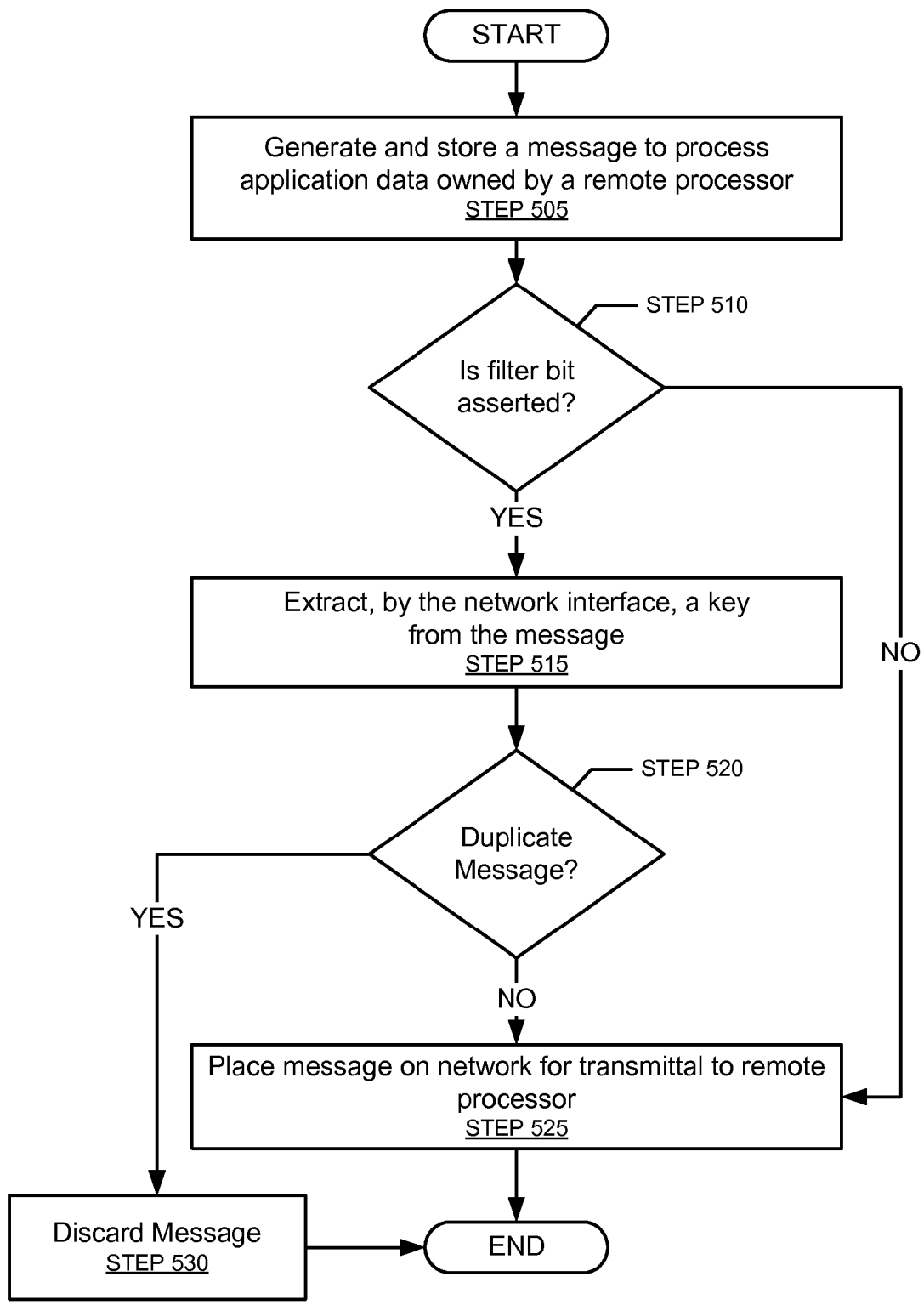
FIG. 5 shows a flowchart in accordance with one or more embodiments of the invention.

FIG. 5 shows a flowchart in accordance with one or more embodiments of the invention. The flowchart depicts a process for data deduplication on the sending side (i.e., by the sending computing node). One or more of the steps in FIG. 5 may be performed by the components of the system (100), discussed above in reference to FIG. 1. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, a message to process a portion of application data owned by a remote processor is generated and stored (STEP 505). The message is generated by a processor that does not own the portion of application data. Moreover, the processor that generates the message and the remote processor may be on different computing nodes connected by a network.

In one or more embodiments of the invention, the message includes a destination identifying/specifying the remote processor, a filter bit, and a payload. The message is stored in a network interface on the same computing node as the processor that generated the message.

In STEP 510, it is determined whether the filter bit of the message is asserted. When it is determined that the filter bit of the message is asserted (e.g., set to "1"), the process proceeds to STEP 515. Otherwise, when it is determined that the filer bit of the message is not asserted (e.g., set to "0"), the process proceeds to STEP 525.

In STEP 515, the network interface extracts a key from the message. The key corresponds to a portion of the payload. The key may be a concatenation of one or more fields in the payload. The starting position of the key and the width of the key may be stored in registers that are readable by the network interface.

In STEP 520, it is determined whether the message is a duplicate message. Specifically, if the extracted key matches a key from a message previously sent by the network interface (i.e., the extracted key is a duplicate key), the message is deemed to be a duplicate message. However, if the extracted key does not match the key of any still-cached message previously sent by the network interface (i.e., the extracted key is not a duplicate key), the message is not deemed to be a duplicate message. In one or more embodiments of the invention, matching the extracted key or attempting to match the extracted key includes searching a cache (or other data structure) using the extracted key as an index. When it is determined that the message is a duplicate message, the process proceeds to STEP 530 and the message generated in STEP 505 is discarded. When it is determined that the message is not a duplicate message, process proceeds to STEP 525. Moreover, the cache (or other data structure) may be updated to identify/specify the extracted key (i.e., the key of the non-duplicate message).

In STEP 525, the message is placed on the network for transmission to the remote processor on a remote computing node. A header may be placed on the message identifying the remote computing node as the destination. Moreover, a CRC code may also be added to the message. In one or more embodiments of the invention, the filter bit is removed from the message before transmission on the network. Upon receiving the payload, the remote processor will perform the requested processing/function on the portion of the application data owned by the remote processor.

Figure 6:
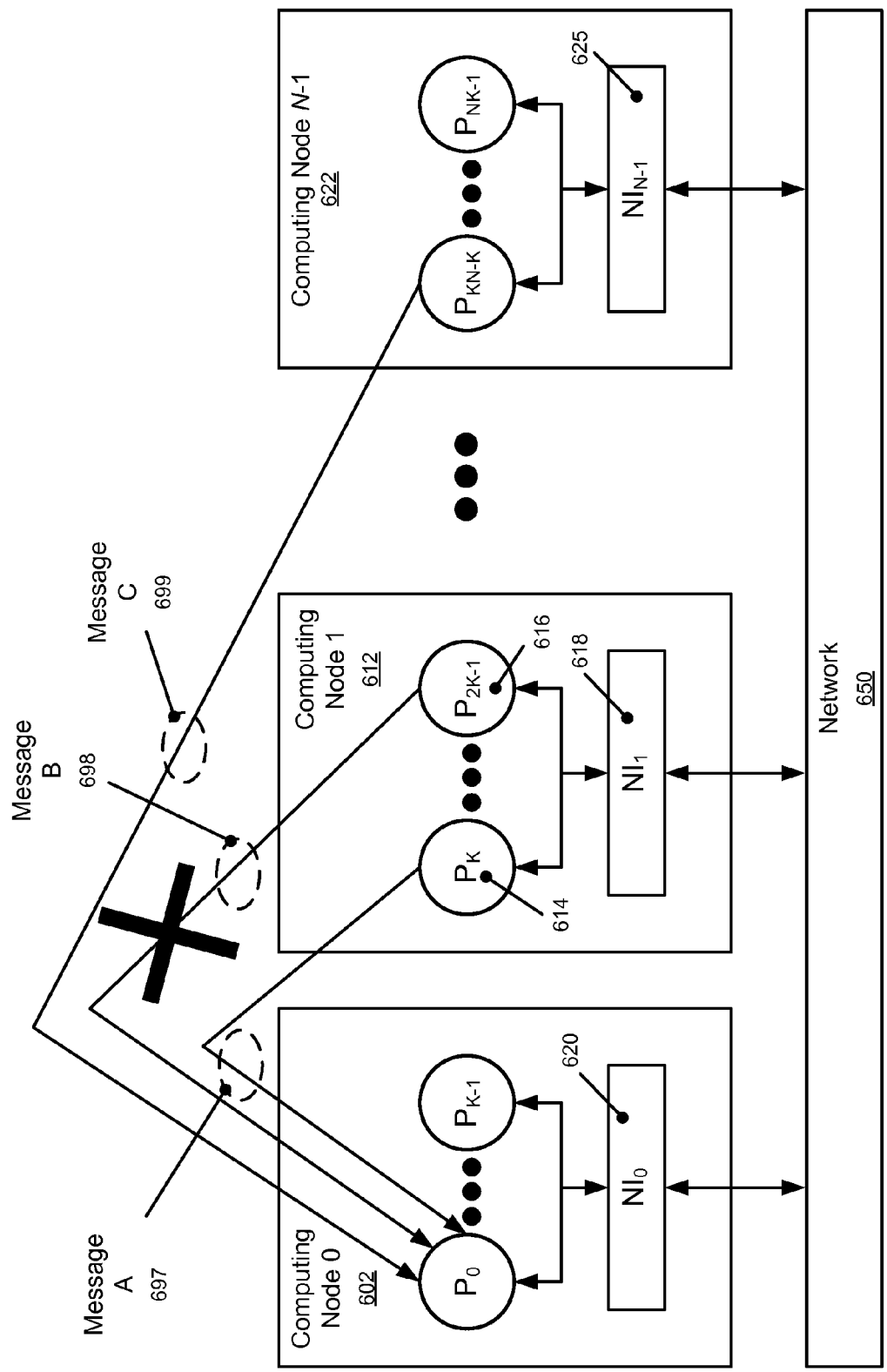
FIG. 6 shows an example in accordance with one or more embodiments of the invention.

FIG. 6 shows an example in accordance with one or more embodiments of the invention. This example demonstrates data deduplication on the sending side (i.e., by the sending node). As shown in FIG. 6, there exists multiple computing nodes: Computing Node 0 (602), Computing Node 1 (612), Computing Node N-1 (622). Each of the computing nodes (602, 612, 622) includes one or more processors and a network interface. For example, computing node 1 (612) includes processor K (614) to processor 2K-1 (616) and network interface 1 (618). As another example, computing node 0 (602) and computing node N-1 (622) include network interface 0 (620) and network interface N-1 (625), respectively. All of the computing nodes are connected by a network (650). Each of network interface 1 (618) and network interface N-1 (625) may be essentially the same as network interface (300), discussed above in reference to FIG. 3, and operate according to the process in FIG. 5.

Assume processor 0 in computing node 0 (602) owns a portion of the application data (e.g., a graph node). Moreover, assume processor K (614) and processor 2K-1 (616) in computing node 1 (612), and processor KN-K in computing node N-1 (622), each generate a message (i.e., Message A (697), Message B (698), Message C (699)) to process the graph node owned by processor 0. As these messages all pertain to the same graph node owned by computing node 0 (602), all of the messages (697, 698, 699) have the same key.

Network interface 1 (618) will place message A (697) on the network (650). Accordingly, the payload of message A (697) will reach processor 0 in computing node 0 (602). However, because message B (698) has the same key as message A (697), message B (698) will be deemed a duplicate message by network interface 1 (618) and discarded. In other words, message B (698) will not be placed on the network (650) and thus bandwidth of the network (650) will not be consumed by duplicate message B (698). Network interface N-1 (625) will place message C (699) on the network (650). Accordingly, the payload of message C (699) will reach processor 0 in computing node 0 (602).

Figure 7:
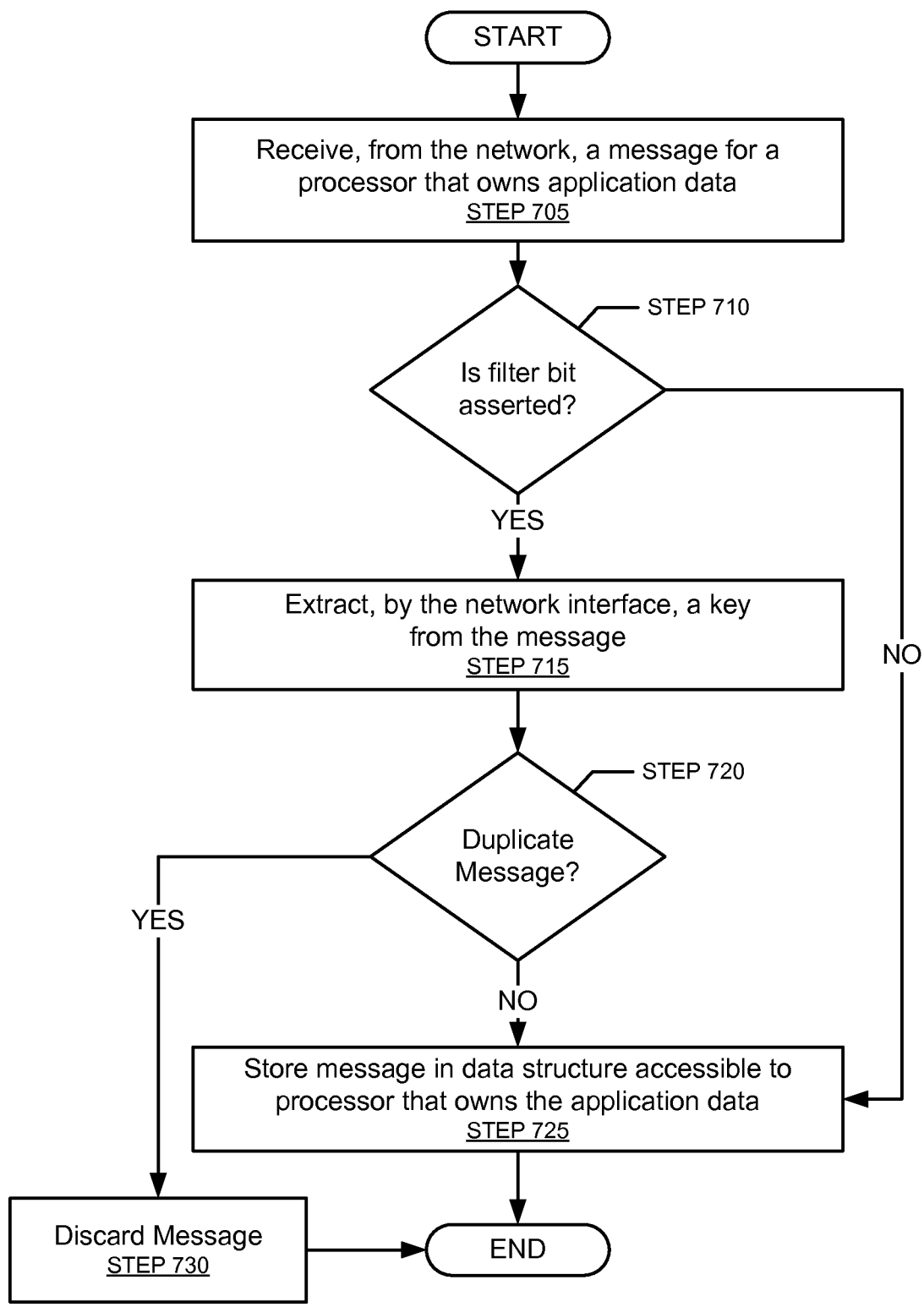
FIG. 7 shows a flowchart in accordance with one or more embodiments of the invention.

FIG. 7 shows a flowchart in accordance with one or more embodiments of the invention. The flowchart depicts a process for data deduplication on the receiving side (i.e., by the receiving computer node). One or more of the steps in FIG. 7 may be performed by the components of the system (100), discussed above in reference to FIG. 1. In one or more embodiments of the invention, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7.

Initially, a message for a processor that owns a portion of application data is received from the network (STEP 705). The message may be received by a network interface on the same computing node as the processor owning the portion of the application data. The message may have been generated by a processor on a different computing node. The message may include a payload, a destination, and a filter bit.

In STEP 710, it is determined whether the filter bit of the message is asserted. When it is determined that the filter bit of the message is asserted (e.g., set to "1"), the process proceeds to STEP 715. Otherwise, when it is determined that the filer bit of the message is not asserted (e.g., set to "0"), the process proceeds to STEP 725.

In STEP 715, the network interface extracts a key from the message. The key corresponds to a portion of the payload. The key may be a concatenation of one or more fields in the payload. The starting position of the key and the width of the key may be stored in registers that are readable by the network interface.

In STEP 720, it is determined whether the message is a duplicate message. Specifically, if the extracted key matches a key from a message previously received by the network interface (i.e., the extracted key is a duplicate key), the message is deemed to be a duplicate message. However, if the extracted key does not match the key of any still-cached message previously received by the network interface (i.e., the extracted key is not a duplicate key), the message is not deemed to be a duplicate message. In one or more embodiments of the invention, matching the extracted key or attempting to match the extracted key includes searching a cache (or other data structure) using the extracted key as an index. When it is determined that the message is a duplicate message, the process proceeds to STEP 730 and the message received in STEP 705 is discarded. When it is determined that the message is not a duplicate message, process proceeds to STEP 725. Moreover, the cache (or other data structure) may be updated to identify/specify the extracted key (i.e., the key of the non-duplicate message).

In STEP 725, the received message, or at least the payload of the received message, is stored in a data structure accessible to the processor that owns the portion of the application data. Upon retrieving the payload, the processor will perform the requested processing/function on the portion of the application data owned by the processor.

Figure 8:
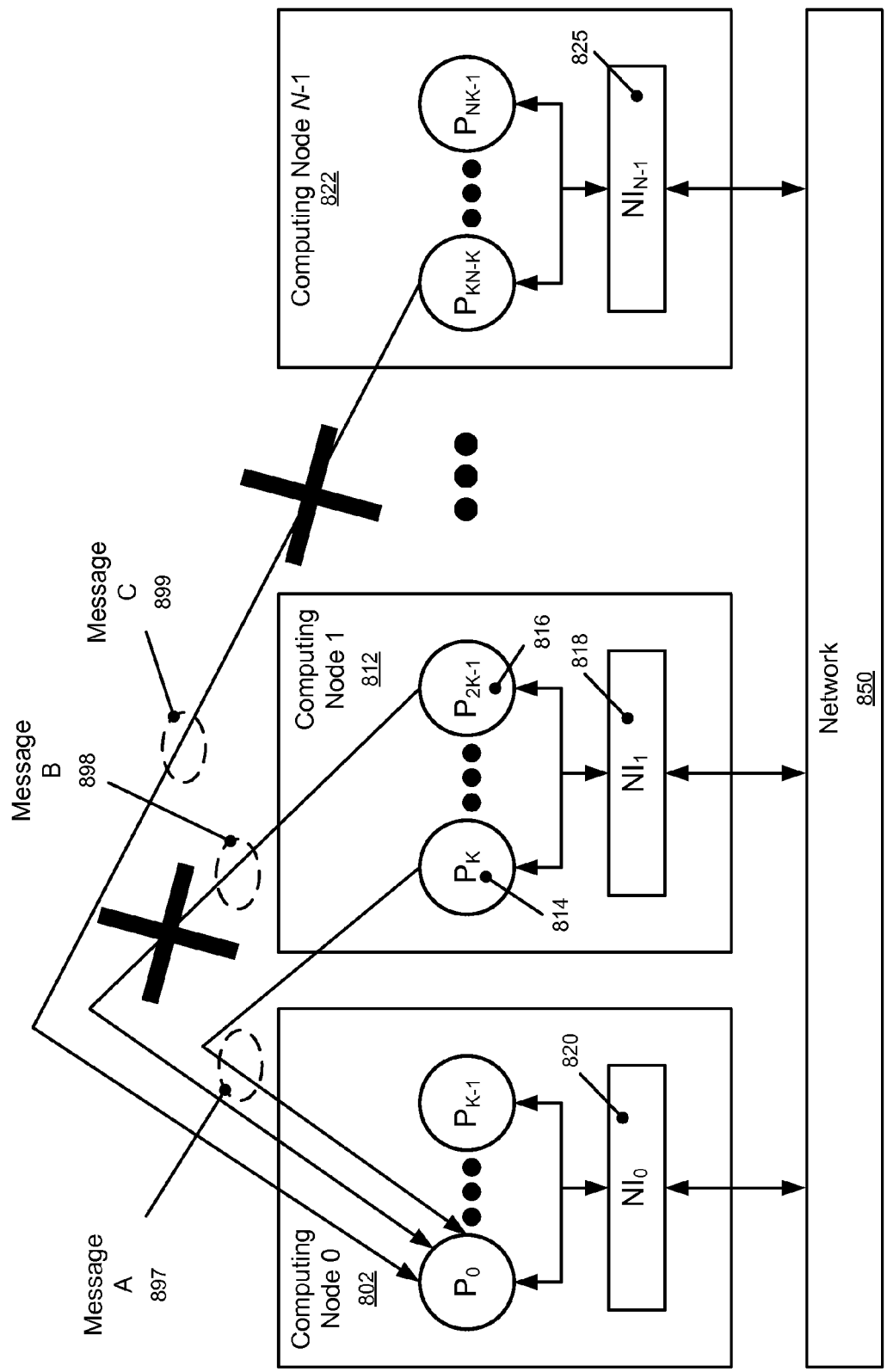
FIG. 8 shows an example in accordance with one or more embodiments of the invention.

FIG. 8 shows an example in accordance with one or more embodiments of the invention. This example demonstrates data deduplication on the receiving side (i.e., by the receiving node). As shown in FIG. 8, there exist multiple computing nodes: Computing Node 0 (802), Computing Node 1 (812), Computing Node N-1 (822). Each of the computing nodes (802, 812, 822) includes one or more processors and a network interface. For example, computing node 1 (812) includes processor K (814) to processor 2K-1 (816) and network interface 1 (818). As another example, computing node 0 (802) and computing node N-1 (822) include network interface 0 (820) and network interface N-1 (825), respectively. All of the computing nodes (802, 812, 822) are connected by a network (850). Network interface 0 (820) may be essentially the same as network interface (400), discussed above in reference to FIG. 4, and operate according to the process in FIG. 7.

Assume processor 0 in computing node 0 (802) owns a portion of the application data (e.g., a graph node). Moreover, assume processor K (814) and processor 2K-1 (816) in computing node 1 (812), and processor KN-K in computing node N-1 (822), each generate a message (i.e., Message A (897), Message B (898), Message C (899)) to process the graph node owned by processor 0. As these messages all pertain to the same graph node owned by computing node 0 (802), all of the messages (897, 898, 899) have the same key.

Network interface 1 (818) will place message A (897) on the network (850). Accordingly, the payload of message A (897) will reach processor 0 in computing node 0 (802). However, because message B (898) has the same key as message A (897), message B (898) will be deemed a duplicate message by network interface 0 (820) and discarded. Network interface N-1 (825) will place message C (899) on the network (850). However, because message C (899) has the same key as message A (897), message C (899) will also be deemed a duplicate message by network interface 0 (820) and discarded.

Embodiments of the invention may have one or more of the following advantages: the ability to discard duplicate messages at a sender network interface and/or a receiver network interface; the ability to reduce bandwidth usage (i.e., free up bandwidth) bandwidth on a network by discarding duplicate messages before they are placed on the network; the ability to identify duplicate messages using keys; the ability to control filtering on a message-by-message basis using a filter bit and a bypass; the ability to track sent messages and received messages using keys; the ability to search for duplicate keys using a cache indexed by keys; the ability to extract keys from messages using one or more registers specifying a starting position of the key and a width of the key; the ability to improve performance of a graph analysis/traversal; etc. Other embodiments of the invention may have additional advantages.

Figure 9:
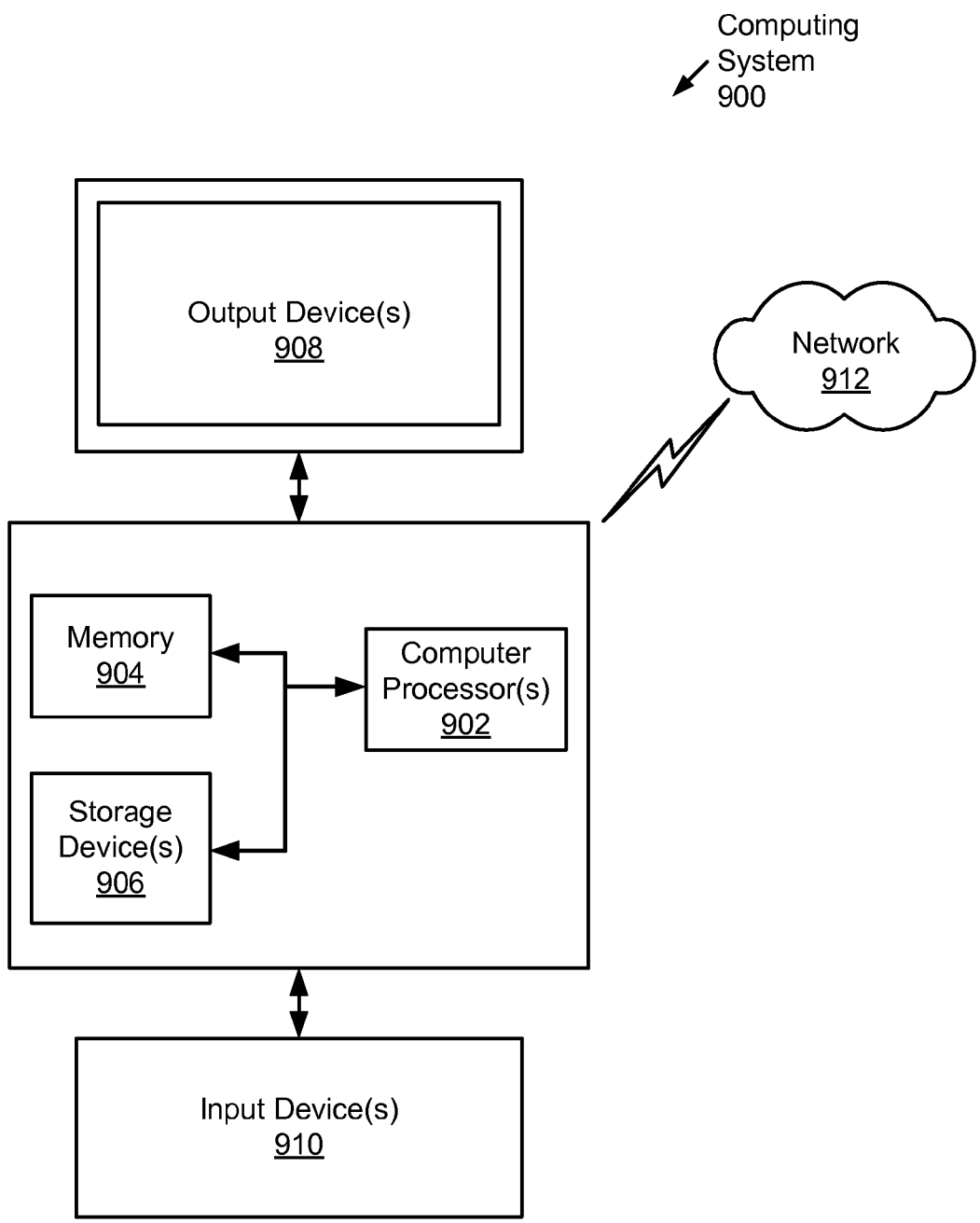
FIG. 9 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and connected to the other elements over a network (912). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data deduplication during execution of an application associated with application data on a plurality of computing nodes, comprising:
   generating, by a first processor in a first computing node executing the application and owning a first portion of the application data, a first message to process a second portion of the application data owned by a second processor in a second computing node executing the application,
   wherein the first message comprises a first key, a filter bit that is set, and a data segment;
   receiving, by a first network interface (NI) of the first computing node, the first message;
   extracting, by the first NI and in response to the filter bit being set, the first key from the first message by:
      obtaining a starting position of the first key by reading a key position register that is external to the first message, wherein the starting position of the first key is stored in the key position register; and
      obtaining a width of the first key by reading a key width register that is external to the first message, wherein the width of the first key is stored in the key width register,
      wherein the first key is a segment of the first message starting at the starting position read from the key position register and having a size equal to the width read from the key width register;
   determining, by the first NI and in response to the filter bit being set, the first message is not a duplicate of previous messages sent by the first NI by determining the first key is not a duplicate of a key in the previous messages sent by the first NI; and
   placing, by the first NI and in response to the first message not being a duplicate, the first message on a network connecting the first computing node to the second computing node.

2. The method of claim 1, further comprising:
   receiving, by the first NI, a second message to process the second portion of the application data owned by the second processor in the second computing node, wherein the first message and the second message have different data segments;
   extracting, by the first NI, a second key from the second message;
   determining, by the first NI, that the second key is a duplicate of the first key; and
   discarding, by the first NI and in response to the second key being a duplicate, the second message without placing the second message on the network.

3. The method of claim 2, wherein the second message is generated by a third processor in the first computing node.

4. The method of claim 2, further comprising:
   populating, in response to determining that the first key is not a duplicate, an entry in a cache indexed by the first key,
   wherein determining the second key is a duplicate of the first key comprises accessing the entry using the second key as an index to the cache.

5. The method of claim 1, further comprising:
   removing, by the first NI and after it is determined that the first key is not a duplicate, the filter bit from the first message before placing the first message on the network.

6. The method of claim 1, wherein the first key comprises a concatenation of a plurality of fields in the first message.

7. The method of claim 1, further comprising:
   receiving, by a second NI of the second computing node, the first message from the network connecting the second computing node and the first computing node;
   extracting, by the second NI, the first key from the first message;
   determining, by the second NI, that the first key is a duplicate; and
   discarding, by the second NI, the first message.

8. The method of claim 7, wherein the first key is extracted by the second NI in response to the filter bit in the message being set.

9. A system for data deduplication during execution of an application associated with application data, comprising:
   a first processor executing the application and located in a first computing node;
   a second processor executing the application and located in the first computing node; and
   a network interface (NI), located in the first computing node, connected to a network, and comprising:
      a first data structure accessible to the first processor;
      a second data structure accessible to the second processor;
      a key position register;
      a key width register; and
      a filter engine configured to:
         receive a first message comprising a filter bit that is set, a request to process a first portion of the application data and a first key;
         extract, in response to the filter bit being set, the first key from the first message by:
            obtain a starting position of the first key by reading the key position register, wherein the starting position of the first key is stored in the key position register; and
            obtain a width of the first key by reading the key width register, wherein the width of the first key is stored in the key width register, and wherein the first key is a segment of the first message starting at the starting position read from the key position register and having a size equal to the width read from the key width register;

determine, in response to the filter bit being set, the first message is a duplicate of a previous message in response to the first key being a duplicate of a key in the previous message; and discard the first message in response to the first message being the duplicate, wherein the key position register and the key width register are external to the first message and populated before the first message is received by the filter engine.

10. The system of claim 9, wherein the first message is generated by the first processor and stored in the first data structure before the first key is extracted, wherein the first portion of the application data is owned by a third processor in a second computing node executing the application, and wherein the first processor owns a second portion of the application data.

11. The system of claim 9, wherein the first message is received by the NI from the network connected to a second computing node comprising a third processor owning a second portion of the application data, and wherein the first portion of the application data is owned by the first processor.

12. The system of claim 11, wherein the filter engine is further configured to:

extract a second key from a second message received by the NI from the network, wherein the second message comprises a request to process data owned by the second processor;

determine the second key is not a duplicate; and store the second message in the second data structure in response to determining the second key is not a duplicate.

13. The system of claim 12, wherein the filter engine further comprises:

a cache identifying keys of previously received messages, wherein determining the first key is a duplicate comprises accessing the cache using the first key as an index, wherein determining the second key is not a duplicate comprises accessing the cache using the second key as an index.

14. The system of claim 13, wherein the filter engine further comprises:

a clear register, wherein the cache is cleared in response to populating the clear register.

15. A system for data deduplication during execution of an application associated with application data, comprising:

a network;

a first node connected to the network and comprising:

a first processor executing the application, owning a first portion of the application data, and configured to generate a first message to process a second portion of the application data owned by a second processor; and a first network interface (NI) configured to:

receive the first message comprising a key and a data segment;

extract the key from the first message by:

obtaining a starting position of the key by reading a key position register that is external to the first message, wherein the key position register stores the starting position of the key; and obtaining a width of the key by reading a key width register that is external to the first message, wherein the width of the key is stored in the key width register, wherein the key is a segment of the first message starting at the starting position read from the key position register and having a size equal to the width read from the key width register; and determine the first message is not a duplicate of previous messages sent by the first NI based on the key not being a duplicate of a key in the previous messages; and place the first message on the network in response to the message not being a duplicate of the previous messages sent by the first NI; and a second node connected to the network and comprising:

the second processor executing the application and owning the second portion of the application data; and a second NI configured to:

receive the first message from the network;

extract the key from the first message and determine that the first message is not a duplicate based on the key; and store the first message in a data structure accessible to the second processor.

16. The system of claim 15, wherein the first message comprises an asserted filter bit set by the first processor, and wherein both the first NI and the second NI determine the first message is not a duplicate in response to the asserted filter bit.

17. The system of claim 15, further comprising:

a third node connected to the network and comprising:

a third processor executing the application and configured to generate a second message to process the second portion of the application data owned by the second processor; and a third NI configured to place the third message on the network, wherein the second NI is configured to discard the second message in response to the second message being a duplicate, and wherein the first message and the second message have the same key but have different data segments.

18. The system of claim 17, wherein the second message comprises the key, and wherein the second NI comprises a cache indexed by the key.

* * * * *